US009485144B2

(12) United States Patent
Phaal

(10) Patent No.: US 9,485,144 B2
(45) Date of Patent: Nov. 1, 2016

(54) NETWORK TRAFFIC OPTIMIZATION

(75) Inventor: Peter Phaal, San Francisco, CA (US)

(73) Assignee: InMon Corp., San Francisco, CA (US)

( * ) Notice: Subject to any disclaimer, the term of this patent is extended or adjusted under 35 U.S.C. 154(b) by 246 days.

(21) Appl. No.: 12/946,102

(22) Filed: Nov. 15, 2010

(65) Prior Publication Data

US 2011/0282986 A1     Nov. 17, 2011

Related U.S. Application Data

(60) Provisional application No. 61/261,115, filed on Nov. 13, 2009.

(51) Int. Cl.
*G06F 15/173* (2006.01)
*H04L 12/24* (2006.01)
*G06F 9/50* (2006.01)

(52) U.S. Cl.
CPC ......... *H04L 41/0823* (2013.01); *G06F 9/5088* (2013.01); *Y02B 60/162* (2013.01)

(58) Field of Classification Search
CPC ..................................................... H04L 47/822
USPC .......................................................... 709/224
See application file for complete search history.

(56) References Cited

U.S. PATENT DOCUMENTS

| | | | |
|---|---|---|---|
| 5,615,323 A | 3/1997 | Engel et al. | |
| 5,790,799 A | 8/1998 | Mogul | |
| 6,085,243 A | 7/2000 | Fletcher et al. | |
| 6,170,022 B1 | 1/2001 | Linville et al. | |
| 6,529,475 B1 | 3/2003 | Wan et al. | |
| 6,636,512 B1 | 10/2003 | Lorrain et al. | |
| 6,678,245 B1 | 1/2004 | Cooper et al. | |
| 6,771,646 B1 | 8/2004 | Sarkissian et al. | |
| 6,795,400 B1 | 9/2004 | Schick | |
| 6,826,150 B1 | 11/2004 | Bhattacharya et al. | |
| 6,934,249 B1 | 8/2005 | Bertin et al. | |
| 7,028,088 B1 | 4/2006 | Koperda et al. | |

(Continued)

FOREIGN PATENT DOCUMENTS

GB    2438454    11/2007

OTHER PUBLICATIONS

Phaal, U.S. Appl. No. 12/492,703, Distributed Traffic Quota Measurement and Enforcement, filed Jun. 26, 2009.

(Continued)

*Primary Examiner* — Wing F Chan
*Assistant Examiner* — Andrew Woo
(74) *Attorney, Agent, or Firm* — Kilpatrick Townsend & Stockton LLP

(57) ABSTRACT

A method of optimizing network traffic includes, in part, measuring amounts of traffic exchange between each of a multitude of hosts disposed in the network, identifying a network domain to which each of the multitude of hosts is connected, calculating a net increase or decrease in inter-domain traffic associated with moving each of the multitude of hosts among the network domains in order to generate a list, and ranking the list of moves by net saving in the inter-domain traffic. The highest ranked move may be automatically applied so as to change the network domain to which the host associated with the highest ranked move is connected. The hosts may be virtual machines. Optionally, a change in the inter-domain traffic as a result of moving a first host in accordance with the list occurs only if one or more conditions are met.

15 Claims, 3 Drawing Sheets

(56) References Cited

U.S. PATENT DOCUMENTS

| | | | |
|---|---|---|---|
| 7,113,477 | B1 | 9/2006 | O'Toole |
| 7,139,274 | B2 | 11/2006 | Attar et al. |
| 7,164,657 | B2 | 1/2007 | Phaal |
| 7,197,008 | B1 | 3/2007 | Shabtay et al. |
| 7,209,434 | B2 | 4/2007 | Kano et al. |
| 7,257,081 | B2 | 8/2007 | Rajan et al. |
| 7,478,156 | B1 | 1/2009 | Pereira |
| 7,486,696 | B2 | 2/2009 | Garg et al. |
| 7,876,681 | B2 | 1/2011 | Pan et al. |
| 7,895,299 | B2 | 2/2011 | Betts et al. |
| 8,005,009 | B2 | 8/2011 | McKee et al. |
| 8,798,056 | B2* | 8/2014 | Ganga .................. G06F 15/16 370/392 |
| 2003/0016626 | A1* | 1/2003 | Lagerberg ........... H04L 12/5695 370/230.1 |
| 2003/0048749 | A1 | 3/2003 | Stamatelakis et al. |
| 2003/0086422 | A1* | 5/2003 | Klinker ................ H04L 29/06 370/389 |
| 2003/0128710 | A1 | 7/2003 | Fedyk et al. |
| 2003/0198190 | A1* | 10/2003 | Rajan et al. .................. 370/252 |
| 2004/0190444 | A1 | 9/2004 | Trudel et al. |
| 2004/0190527 | A1 | 9/2004 | Okura et al. |
| 2004/0213155 | A1 | 10/2004 | Xu et al. |
| 2005/0052992 | A1 | 3/2005 | Cloonan et al. |
| 2005/0111367 | A1 | 5/2005 | Jonathan et al. |
| 2005/0286434 | A1 | 12/2005 | McKee |
| 2006/0050634 | A1* | 3/2006 | Gous .............................. 370/229 |
| 2007/0081543 | A1 | 4/2007 | Brenes et al. |
| 2007/0250642 | A1* | 10/2007 | Thubert ............ H04L 29/12915 709/245 |
| 2008/0155537 | A1* | 6/2008 | Dinda ................... G06F 9/4887 718/1 |
| 2011/0004698 | A1* | 1/2011 | Wu ..................... G06F 9/45558 709/235 |

OTHER PUBLICATIONS

Claffy et al., "Application of Sampling Methodologies to Network Traffic Characterization," Computer Communication Review, SIGCOMM'93 Conference Proceedings, Sep. 13-17, 1993, pp. 194-203.

Brownlee, "Traffic Flow Measurements: Meter MIB," Network Working Group, The University of Aukland, Jan. 1997, pp. 1-38.
Non-Final Office Action for U.S. Appl. No. 12/492,703, mailed on Nov. 24, 2010, 9 pages.
Non-Final Office Action for U.S. Appl. No. 10/877,853, mailed on Aug. 21, 2007, 27 pages.
Non-Final Office Action for U.S. Appl. No. 10/877,853, mailed on Jun. 6, 2008, 28 pages.
Non-Final Office Action for U.S. Appl. No. 10/877,853, mailed on Feb. 26, 2009, 15 pages.
Final Office Action for U.S. Appl. No. 10/877,853, mailed on Jul. 30, 2009, 14 pages.
Non-Final Office Action for U.S. Appl. No. 10/877,853, mailed on Mar. 16, 2010, 13 pages.
Non-Final Office Action for U.S. Appl. No. 10/877,853, mailed on Dec. 7, 2010, 13 pages.
Final Office Action for U.S. Appl. No. 12/492,703, mailed on May 10, 2012, 12 pages.
Notice of Allowance for U.S. Appl. No. 10/877,853, mailed Jun. 2, 20011, 8 pages.
Non-Final Office Action for U.S. Appl. No. 12/492,703, mailed on Aug. 23, 2011, 8 pages.
U.S. Appl. No. 12/492,703, filed Jun. 26, 2009, 13 pages.
Non-Final Office Action for U.S. Appl. No. 12/492,703 (Nov. 21, 2012) 11 pages.
Final Office Action for U.S. Appl. No. 12/492,703 (Aug. 7, 2013) 12 pages.
Final Office Action for U.S. Appl. No. 12/492,703 (Feb. 10, 2014) 20 pages.
Non-Final Office Action for U.S. Appl. No. 12/492,703 mailed on Aug. 26, 2014, 9 pages.
Final Office Action for U.S. Appl. No. 12/492,703 mailed on Feb. 10, 2015, 9 pages.
Non-Final Office Action for U.S. Appl. No. 12/492,703 mailed on Jul. 10, 2015, 11 pages.
Final Office Action for U.S. Appl. No. 12/492,703 mailed on Jan. 25, 2016, 11 pages.
Non-Final Office Action for U.S. Appl. No. 12/492,703 mailed on May 4, 2016, 10 pages.
Final Office Action for U.S. Appl. No. 12/492,703 mailed on Aug. 26, 2016, 10 pages.

* cited by examiner

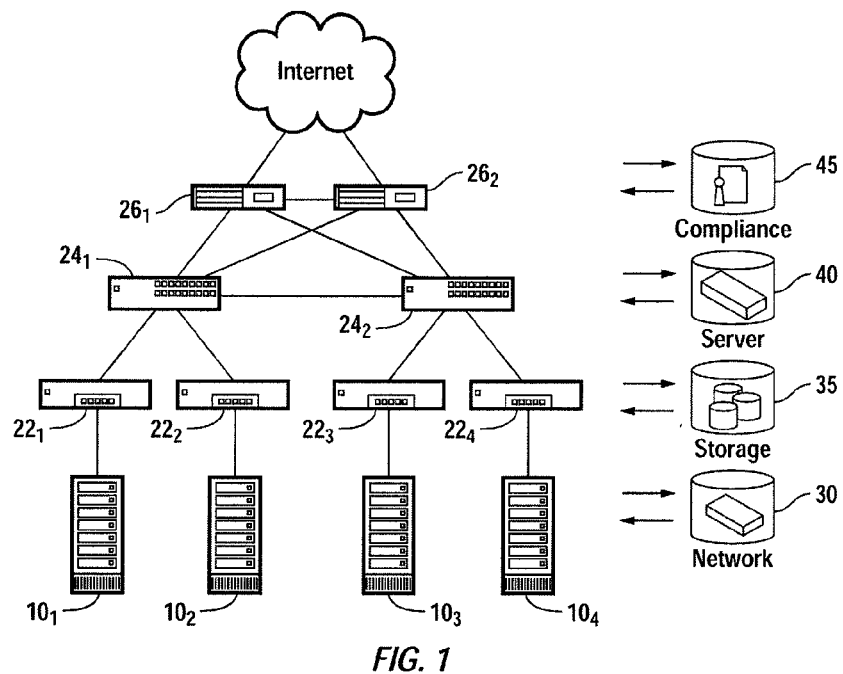
FIG. 1
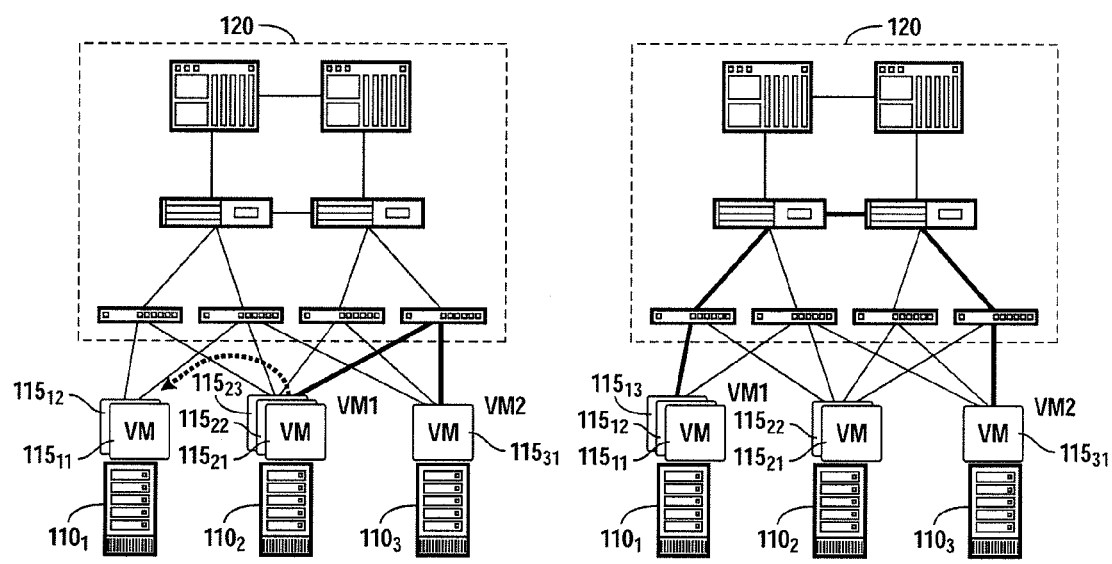
FIG. 2A
FIG. 2B

NETWORK TRAFFIC OPTIMIZATION

CROSS-REFERENCES TO RELATED APPLICATIONS

The present application claims benefit under 35 USC 119(e) of U.S. provisional application No. 61/261,115, filed Nov. 13, 2009, entitled "Network Traffic Optimization," the content of which is incorporated herein by reference in its entirety.

The present application is related to and incorporates by reference application Ser. No. 10/877,853, filed Jun. 25, 2004, the content of which is incorporated herein by reference in its entirety.

BACKGROUND OF THE INVENTION

Conventionally, management of networked computer systems in organizations is divided among a number of groups such as networking, storage, systems, and possibly groups in charge of maintaining regulatory compliance. Enterprise applications require resources from each such functional area; a failure in any of these areas can have a significant impact on the business. The strategy of splitting the management responsibilities by functional areas has worked so far because the functional areas have traditionally been loosely coupled and the data center environments have been relatively static.

The trend towards convergence of computing, storage and networking in order to create a more dynamic and efficient infrastructure makes these functions dependent on each other. For example, server virtualization means that a small change made by the systems group may have a major effect on the network bandwidth. The increasing demand for bandwidth by networked storage accounts for a significant proportion of the overall network bandwidth, thereby making the network vulnerable to changes made by the storage group. In order to maintain the services in a converged environment, the complex relationships between various network elements need to be managed properly.

FIG. 1 shows a network communication system 100 that includes a multitude of switches configured to connect a multitude of hosts to each other and to the Internet. Four exemplary hosts $10_1$, $10_2$, $10_3$, $10_4$ (alternatively and collectively referred to as host 10), are shown as being in communication with the Internet via switches $22_1$, $22_2$, $22_3$, $22_4$, (alternatively and collectively referred to as switch 22), switches $24_1$, $24_2$ (alternatively and collectively referred to as switch 24), and switches $26_1$, $26_2$ (alternatively and collectively referred to as switch 26). Network communication system 100 is controlled, in part, by network equipment group 30, storage group 35, server group 40, and regulatory compliance group 45. Each such group monitors its own resources and uses its own management tools and thus has very limited visibility into the other components of the data center.

FIGS. 2A and 2B show the challenge faced in managing a networked system using a conventional technique. FIG. 2A shows a network communication system that includes a multitude of servers $110_1$, $110_2$, $110_3$ as well as a multitude of switches collectively identified using reference number 120. Each server $110_i$ is shown as having one or more associated virtual machines (VM) $115_j$. For example, server $110_1$ is shown as having associated VMs $115_{11}$ and $115_{12}$; server $110_2$ is shown as having associated VMs $115_{21}$, $115_{22}$, and $115_{23}$; and server $110_3$ is shown as having associated VM $115_{31}$. Assume that a system manager decides to move virtual machine $115_{23}$ from server $110_2$ to server $110_1$—shown as VM $115_{13}$ in FIG. 2B following the move. The system management tools show that there is enough capacity on the destination server $110_1$ thus suggesting that the move would be safe. However, the move can cause the storage traffic, which had previously been confined to a single switch, to congest links across the data center causing system wide performance problems. The conventional siloed approach in which different teams manage the network, storage and servers has a number of shortcomings.

BRIEF SUMMARY OF THE INVENTION

A method of optimizing network traffic, in accordance with one embodiment of the present invention, includes, in part, measuring amounts of traffic exchange between each of a multitude of hosts disposed in the network, identifying a network domain to which each of the multitude of hosts is connected, calculating a net increase or decrease in inter-domain traffic associated with moving each of the multitude of hosts among the network domains in order to generate a list, and ranking the list of moves by net saving in the inter-domain traffic.

In one embodiment, the highest ranked move is automatically applied so as to change the network domain to which the host associated with the highest ranked move is connected. In one embodiment, the hosts are virtual machines. In one embodiment, a change in the inter-domain traffic as a result of moving a first host in accordance with the list occurs only if one or more conditions are met. In one embodiment, at least one of the conditions is defined by availability of a resource of a second host connected to the domain to which the first host is to be moved. In one embodiment, such a resource is the CPU resource of the second host. In one embodiment, at least one of the conditions defines a threshold that is to be exceeded before the first host is moved. In one embodiment, the network domain is a switch.

A computer readable medium, in accordance with one embodiment of the present invention, includes instructions that when executed by one or more processors cause the one or more processors to optimize network traffic. To achieve this, the instructions further cause the processor(s) to measure amounts of traffic exchange between each of the multitude of hosts disposed in the network and in which the processor(s) is (are) disposed, identify a network domain to which each of the multitude of hosts is connected, calculate a net increase or decrease in inter-domain traffic associated with moving each of the multitude of hosts among the multitude of domains to generate a list, and rank the list of moves by net saving in the inter-domain traffic.

In one embodiment, the instructions further cause the highest ranked move to be automatically occur so as to change the network domain to which the host associated with the highest ranked move is connected. In one embodiment, the hosts are virtual machines. In one embodiment, the instructions further cause the processor(s) to cause a change in inter-domain traffic by moving a first hosts in accordance with the list only if one or more conditions are met. In one embodiment, at least one of the conditions is defined by availability of a resource associated with a second host connected to a network domain to which the first host is to be moved. In one embodiment, such a resource is the CPU resource of the second host. In one embodiment, at least one of the conditions defines a threshold that is to be exceeded before the first host is moved. In one embodiment, the network domain is a switch.

A system adapted to optimize network traffic, in accordance with one embodiment of the present invention, includes, in part, a module operative to measure amounts of traffic exchange between each of the multitude of the hosts disposed in the network, a module operative to identify a network domain to which each of the multitude of hosts is connected, a module operative to calculate a net increase or decrease in inter-domain traffic associated with moving each of the multitude of hosts among a multitude of network domains to generate a list, and a module operative to rank the list of moves by net saving in the inter-domain traffic.

In one embodiment, the system further includes a module operative to automatically apply the highest ranked move so as to change the network domain to which the host associated with the highest ranked move is connected. In one embodiment, the hosts are virtual machines. In one embodiment, the system further includes a module that causes a change in inter-domain traffic by moving a first hosts in accordance with the list only if one or more conditions are met. In one embodiment, at least one of the conditions is defined by availability of a resource disposed in a second host connected to a network domain to which the first host is to be moved. In one embodiment, the resource is a CPU resource of the second host. In one embodiment, at least one of the conditions defines a threshold to be exceeded prior to moving the first host. In one embodiment, the network domain is a switch.

BRIEF DESCRIPTION OF THE DRAWINGS

FIG. 1 shows a network communication system that includes a multitude of switches configured to connect a multitude of hosts to each other and to the Internet.

FIG. 2A shows a network communication system that includes a multitude of hosts and switches.

FIG. 2B shows the network communication system of FIG. 2A after one of its virtual machines has been moved from one host to another host.

DETAILED DESCRIPTION OF THE INVENTION

Convergence and interdependence between the resources in a data center require a cross functional approach to management in order to ensure successful operation. To achieve greater scalability, shared visibility into all elements of a data center, and an integrated management strategy, in accordance with one aspect of the present invention, all components in a data center are monitored by a single traffic monitoring system. Data center wide visibility is critical to ensuring that each group is aware of the impact of its actions on shared resources and to providing the information needed to enhance the control of the data center.

Current trends toward Virtualization, Converged Enhanced Ethernet (CEE), Fibre Channel over Ethernet (FCoE), Service Oriented Architectures (SOA) and Cloud Computing are part of a broader re-architecture of the data centers in which enterprise applications are decomposed into simpler elements that can be deployed, moved, replicated and connected using high-speed switched Ethernet.

An integrated approach to management is needed if the full benefits of a converged data center are to be realized. Ensuring network-wide visibility into the storage, network and services running in the data center, their traffic volumes, and their dependencies are critical components of an integrated management strategy. In order to achieve data center wide visibility, every layer of the data center network, including the core, distribution, top of rack and blade server switches are taken into account, as described further below in accordance with various embodiments of the present invention.

Figure 3:
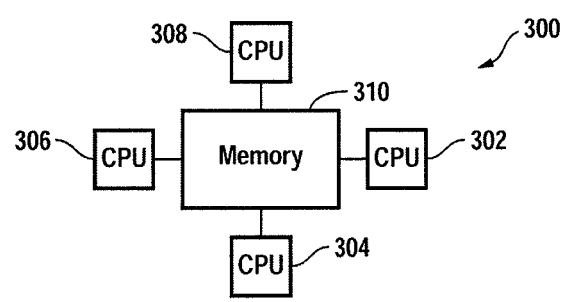
FIG. 3 shows a Symmetric Multi-Processing architecture having four CPUs and a shared memory.
Figure 4:
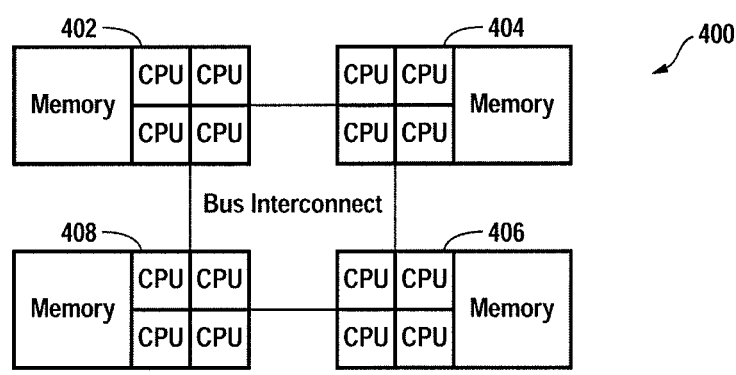
FIG. 4 shows the processors and memories forming a Non-Uniform Memory Access architecture

FIG. 3 shows a Symmetric Multi-Processing (SMP) architecture 300 having four CPUs 302, 304, 306, and 308 sharing a memory 310. FIG. 4 shows a Non-Uniform Memory Access (NUMA) architecture 400 that includes four processors 402, 404, 406, 408 each having four CPUs and a memory. The processors are connected to one another via a high speed bus 410. As the number of processor cores increases, system architectures have moved from SMP to NUMA. SMP systems are limited in scalability by contention for access to the shared memory. In a NUMA system, memory is divided among groups of CPU's, increasing the bandwidth and reducing latency of access to memory within a module at the cost of increased latency for non-local memory access. Intel Xeon® (Nahalem) and AMD Opteron® (Magny-Cours) based servers provide commodity examples of the NUMA architecture.

System software running on a NUMA architecture are aware of the processor topology in order to properly allocate memory and processes to maximize performance. Since NUMA based servers are widely deployed, most server operating systems are NUMA aware and take location into account when scheduling tasks and allocating memory. Virtualization platforms also need to be location aware when allocating resources to virtual machines on NUMA systems.

Ethernet networks share similar NUMA-like properties. Sending data over a short transmission path offers lower latency and higher bandwidth than sending the data over a longer transmission path. While bandwidth within an Ethernet switch is high (multi-Terrabit capacity backplanes are not uncommon), the bandwidth of Ethernet links connecting switches is only 1 Gbit/s or 10 Gbit/s (with 40 Gbit/s and 100 Gbit/s under development). Shortest path bridging (see 802.1aq and Trill) further increases the amount of bandwidth, and reduces the latency of communication, between systems that are close.

In accordance with embodiment of the present invention, the traffic matrix representing the amount of traffic between each pair of hosts on the network is used to optimize network traffic. Network traffic optimization, in accordance with embodiments of the present invention, may be used to automate migration of servers in order to minimize inter-domain traffic. It is understood that a network domain refers to the same branch in the network hierarchy that is shared by the same hosts. Likewise, inter-domain traffic refers to traffic between hosts positioned along different branches of the network. Traffic between different branches of a network is facilitated by a network traffic equipment such as a switch, a router, and the like. Combining data from multiple locations to generate an end-to-end traffic matrix is described in application Ser. No. 10/877,853, filed Jun. 25, 2004, the content of which is incorporated herein by reference in its entirety. The following description of the embodiments of the present invention are described with respect to the sFlow® standard, a leading, multi-vendor standard for monitoring high-speed switched and routed networks. It is understood that embodiments of the present invention are equally applicable to any other network monitoring technology, sFlow® or otherwise. Detailed description of the sFlow® technology is provided, for example, on http://www.inmon.com/technology/index.php; and http://sflow.org/. Moreover, although the following description is provided with reference to network switches, it is understood that any network device, whether implemented in hardware, software or a combination therefore, that facilitates inter-domain and intra-domain traffic may be used and falls within the scope of embodiments of the present invention.

The sFlow® measurement technology, built into computers and network equipment from a number of leading vendors, such as HP®, IBM®, Dell®, Brocade °, BLADE®, Juniper®, Force10® and 3Com®, ensures data center wide visibility of all resources, including switches, storage servers, blade servers and virtual servers. As networks, systems and storage converge, the visibility provided by the sFlow® in the network provides an increasingly fuller picture of all aspects of the data center operations, thus enabling effective management and control of the network resources and delivering the converged visibility needed to manage the converged data center.

Unlike other monitoring technologies, the sFlow® provides an integrated, end-to-end, view of the network performance. This integration substantially increases the value of information by making it actionable. For example, identifying that an application is running slowly isn't enough to solve a performance problem. However, if it is also known that the server hosting the application is seeing poor disk performance, can link the disk performance to a slow NFS server, can identify the other clients of the NFS server, and can finally determine that all the requests are competing for access to a single file, then the decision to take action can be much more informed. It is this ability to link data together, combined with the scalability to monitor every resource in the data center that the sFlow® advantageously provides.

The sFlow® standard includes physical and virtual server performance metrics. The sFlow® specification describes a coherent framework that builds on the sFlow® metrics exported by most switch vendors, thus linking network, server and application performance monitoring to provide an integrated picture of the network performance.

If two hosts are connected to the same switch, the switch backplane provides enough bandwidth so that traffic between the hosts does not compete with other traffic on the network. If the two hosts are on different switches, then the links between the switches are shared and generally oversubscribed. The capacity of the links between switches is often an order of magnitude less than the bandwidth available within the switch itself.

A traffic matrix, which describes the amount of traffic between each pair of hosts (alternatively referred to herein as servers) on the network, can be formed using the sFlow® standard. For example, assume that a network has four hosts A, B, C and D. The traffic between all pairs of hosts may be represented as a 4×4 table (a matrix), as shown below:

TABLE I

|        | To A | To B | To C | To D |
|--------|------|------|------|------|
| From A | 0    | 1    | 2    | 2    |
| From B | 1    | 0    | 3    | 3    |

TABLE I-continued

|        | To A | To B | To C | To D |
|--------|------|------|------|------|
| From C | 2    | 1    | 0    | 2    |
| From D | 3    | 2    | 1    | 0    |

Assume further that information about the switch that each host is connected to is also known. A number of techniques exists for locating hosts. One such technique is described in application Ser. No. 10/877,853, filed Jun. 25, 2004, the content of which is incorporated herein by reference in its entirety. Assume that the following location information is available for the example shown in Table I:

TABLE II

| Host | Switch |
|------|--------|
| A    | SW1    |
| B    | SW1    |
| C    | SW2    |
| D    | SW2    |

In accordance with one embodiment of the present invention, network configuration changes, such as moving a host from one switch to another, are identified and used so as to minimize the amount of traffic between switches and increase the amount of traffic within switches. To achieve this, first, the total amount of traffic to or from each host is calculated. Continuing with the example above, the following shows the total amount of traffic to or from each host:

Total $A$=sum(row $A$)+sum(column $A$)=11

Total $B$=sum(row $B$)+sum(column $B$)=11

Total $C$=sum(row $C$)+sum(column $C$)=11

Total $D$=sum(row $D$)+sum(column $D$)=13

The location data is subsequently used to calculate the amount of traffic that each host exchanges with the hosts on each of the other switches. Table III below shows the amount of traffic each host in Table I exchanges with the host on each of switches:

TABLE III

| Host | SW1 | SW2 |
|------|-----|-----|
| A    | 2   | 9   |
| B    | 2   | 9   |
| C    | 8   | 3   |
| D    | 10  | 3   |

The net effect of moving hosts between switches may thus be calculated. As seen from Table III, host A is shown as exchanging 2 units of traffic with the hosts on SW1, and 9 units of traffic with the hosts on SW2. Moving host A from SW1 to SW2 would thus result in a net reduction of inter-switch traffic of 7 (9−2) since traffic exchanged with hosts C and D would now be local (9) and traffic exchanged with host B would now be non-local (2). Accordingly, the net increase or decrease in inter-switch traffic can be calculated for each possible move and the results can be sorted by net-saving to produce a list of recommended moves. The net effect of moving the hosts between switches for the above example is shown in Table IV below.

TABLE IV

| Host | Current Switch | Proposed Switch | Net Savings |
|------|----------------|-----------------|-------------|
| A    | SW1            | SW2             | 7           |
| B    | SW1            | SW2             | 7           |
| D    | SW2            | SW1             | 7           |
| C    | SW2            | SW1             | 5           |

While physically reconfiguring and relocating servers is a difficult process that would only be carried out if there were compelling reasons, server virtualization makes this process far simpler. The advent of virtual servers allows server software to migrate between physical servers. Since the traffic that a server generates is a function of the software, moving a virtual server will also move its traffic. Popular virtualization software such as VMWare and Xen both provide the ability to easily move virtual machines from one physical server to another.

Virtualization and the need to support virtual machine mobility (e.g. vMotion, XenMotion, Xen Live Migration, associated with VMware and Citrix XenServer products) are driving the adoption of large, flat, high-speed, layer-2, switched Ethernet fabrics in data centers. A layer-2 fabric allows a virtual machine to keeps its IP address and maintain network connections even after the virtual machine is moved (performing a "live" migration). However, while a layer-2 fabric provides transparent connectivity that allows virtual machines to move, the performance of the virtual machine is highly dependent on its communication patterns and location.

As servers are pooled into large clusters, virtual machines may easily be moved, not just between NUMA nodes within a servers, but between servers within the cluster. For optimal performance, the cluster management software needs to be aware of the network topology and workloads in order to place each VM in the optimal location. The inclusion of the sFlow standard in network switches and virtualization platforms provides the visibility into each virtual machine's current workload and dependencies, including tracking the virtual machine as it migrates across the data center.

Figure 5:
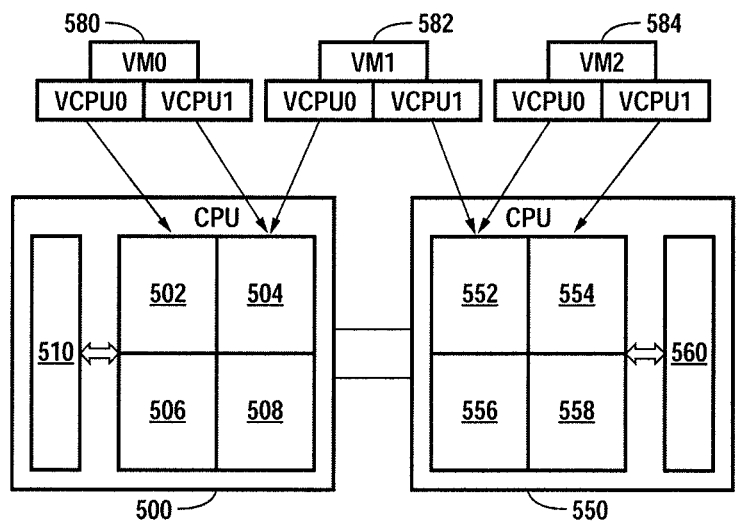
FIG. 5 shows the association between a number of virtual machines and a pair of nodes hosting the virtual machines.

FIG. 5 shows the association between virtual machines 580, 582, and 584 and a pair of NUMA nodes 500 and 550. Each NUMA node is shown as having four CPUS and a memory. For example, NUMA node 500 is shown as having CPUS 502, 504, 506, 508, and memory 510. Each virtual machine is shown as having a pair of virtual CPUs, namely VCPU0 and VCPU1. VCPU0 and VCPU1 of virtual machine 580 are shown as being respectively associated with CPUs 502 and 504 of node 500. VCPU0 of virtual machine 582 is shown as being associated with CPU 504 of node 500, whereas VCPU1 of virtual machines 582 is associated with CPU 552 of node 500. Likewise, VCPU0 and VCPU1 of virtual machine 584 are shown as being respectively associated with CPUs 552 and 554 of node 550. As is well known, the virtual machines are connected to one or more virtual switches which are application software running on the nodes. Consequently, the communication bandwidth is higher for virtual machines that are on the same node and relatively lower for virtual machines that are on different nodes. For example, assume that virtual machines 580 and 584 exchange a substantial amount of traffic. Assume further that a network traffic optimization technique, in accordance with embodiments of the present invention, shows that node 500 currently hosting virtual machine 580 is close to full capacity, whereas node 550 hosting virtual machine 584 is identified as having spare capacity. Consequently, migrating virtual machine 580 to node 550 reduces network traffic, and reduces the latency of communication between virtual machines 580 and 584. In accordance with embodiments of the present invention, the association between virtual machines and the nodes may be varied to optimize network traffic. A network traffic optimization technique, in accordance with embodiments of the present invention, thus provides substantial visibility which is key to controlling costs, improving efficiency, reducing power and optimizing performance in the data center.

Additional constraints may also be applied before causing a change in network traffic movement. For example, a move may be considered feasible if enough spare capacity exists on the destination host to accommodate the new virtual machine. Standard system performance metrics (CPU/memory/IO utilization) can be used to apply these constrains, thus allowing a move to occur only when the constraints are satisfied. Other constraints may also be applied in order to determine whether conditions for a move is met. The following is a code for generating tables II, III, and IV—using data associated with a network traffic matrix—in order to optimize the network traffic, in accordance with one exemplary embodiment of the present invention.

```
String.prototype.startsWith = function(str) {return (this.match("^"+str)==str)}
// start by finding the top communicating mac pairs
var select = ['macsource,rate(bytes)',
              'macdestination,rate(bytes)',
              'macsource,macdestination,rate(bytes)'];
var where = [null,
             'isunicast=1',
             'isunicast=1'];
var q = Query.topN('historytrmx',
            select,
            where,
            'today',
            'bytes',
            1000);
q.multiquery = true;
addrs = { };
pairs = { };
function updateaddrs(hash,key,val) {
    if(!hash[key]) hash[key] = val;
    else hash[key] += val;
}
```

```
function updatepairs(hash,addr,key,val) {
    var chash = hash[addr];
    if(!hash[addr]) {
        chash = { };
        hash[addr] = chash;
    }
    updateaddrs(chash,key,val);
}
var t = q.run([
    function(row) {
        var addr = row[0];
        var bytes = row[1];
        if(addr) updateaddrs(addrs,addr,bytes);
    },
    function(row) {
        var addr = row[0];
        var bytes = row[1];
        if(addr) updateaddrs(addrs,addr,bytes);
    },
    function(row) {
        var src = row[0];
        var dst = row[1];
        var bytes = row[2];
        if(src && dst) {
            updatepairs(pairs,src,dst,bytes);
            updatepairs(pairs,dst,src,bytes);
        }
    }
]);
// locate the mac addresses
var addrarr = [ ];
for (var addr in addrs) addrarr.push(addr);
var n = Network.current( );
var locations = n.locationMap(addrarr);
var agentmap = { };
var portmap = { };
for (var i = 0; i < addrarr.length; i++) {
    var loc = locations[i];
    var addr = addrarr [i];
    if(loc) {
        n.path = loc;
        agentmap[addr] = n.agentIP( );
        portmap[addr] = loc;
    }
}
var result = Table.create(
["MAC","From Zone","From Group","From Port","%Local","To Zone","To Group","To Agent","%Local","Bits/sec. Saved"],
["address","string","string","interface","double","string","string","agent","double","integer"]);
// find moves that reduce interswitch traffic
for(var addr in pairs) {
    var bytes = addrs[addr];
    var sagent = agentmap[addr];
    if(sagent) {
        var siblings = pairs[addr];
        var dagents = { };
        for(var sib in siblings) {
            var dagent = agentmap[sib];
            if(dagent) {
                var sbytes = siblings[sib];
                updateaddrs(dagents,dagent,sbytes);
            }
        }
        for(var dagent in dagents) {
            var dbytes = dagents[dagent];
            var sbytes = dagents[sagent] ? dagents[sagent] : 0;
            if(sagent != dagent) {
                var netsaving = dbytes - sbytes;
                //&& addr.startsWith('005056')
                if(netsaving > 0 ) {
                    n.path = sagent;
                    var szone = n.zone( );
                    var sgroup = n.group( );
                    n.path = dagent;
                    var dzone = n.zone( );
                    var dgroup = n.group( );
                    result.addRow([addr,
                        szone,
                        sgroup,
```

```
                        portmap[addr],
                        100*sbytes/bytes,
                        dzone,
                        dgroup,
                        dagent,
                        100*dbytes/bytes,
                        netsaving]);
                }
            }
        }
    }
}
result.sort(9,true);
// splice in vendor codes
result.insertColumn("MAC Vendor","string",n.vendorMap(result.column(0)),1);
result.scaleColumn(10,8);
// prune the table, 1 move suggestion per mac, limit rows to truncate value
var suggested = { };
var truncated = Table.create(result.cnames,result.ctypes);
for(var r = 0; r < result.nrows; r++) {
    var mac = result.cell(r,0);
    if(!suggested[mac]) {
        truncated.addRow(result.row(r));
        suggested[mac] = true;
        if(truncated.nrows > truncate) break;
    }
}
//result.nrows = Math.min(result.nrows,truncate);
Report.current( ).table(truncated);
```

The embodiments of the present invention apply to any data network and at any level of hierarchy and abstraction. For example, a network may be formed by connecting (i) the CPUs within a server, (ii) a multitude of servers, (iii) a multitude of data centers, and the like. At any level of network, it is desired to keep traffic local. Accordingly, embodiments of the present invention may be applied to a traffic matrix at any level of network abstraction to optimize network traffic.

Figure 6:
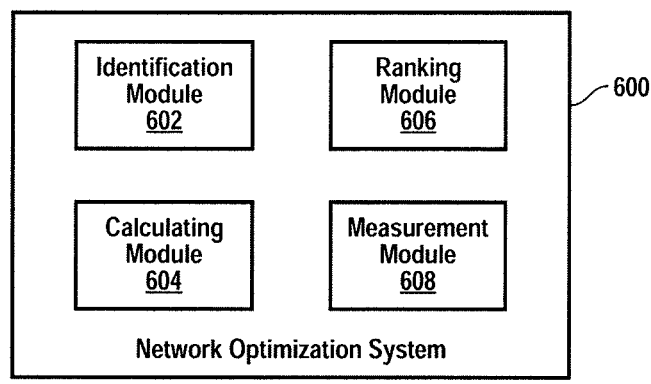
FIG. 6 shows a number of modules of a network optimization system, in accordance with one exemplary embodiment of the present invention.

FIG. 6 shows a network traffic optimization system 600 in accordance with one embodiment of the present invention. System 600 is shown as including, in part, an identification module 602, a calculating module 604, a ranking module 606, and a measurement module 608. Identification module 602 is adapted to identify the network domain to which each of the hosts of interest are connected. Calculating module 604 is adapted to calculate the net increase or decrease in inter-domain traffic associated with moving the hosts among the network domains. Measurement module 608 measures the amount of traffic exchange among the of hosts. Ranking module 606 is adapted to rank the list of moves by net saving in the inter-domain traffic. In one embodiment, the hosts are virtual machines. Apply module (not shown) is adapted to automatically apply the highest ranked move so as to change the network domain to which the host associated with the highest ranked move is connected. Change module (not shown) is adapted to cause a change in inter-domain traffic by moving a first host in accordance with the list if one or more conditions are met. In an embodiment, at least one of the one of more conditions is defined by availability of a resource associated with a second host that is connected to the network domain to which the first host is to be moved. The resource can be a CPU resource of the second host. In another embodiment, at least one of the one or more conditions defines a threshold that is to be exceeded prior to moving the first host. It is understood that modules 602, 604, 606, 608, and 610 may be software modules, hardware modules, or a combination of software and hardware modules. In one embodiment, each module may have a blade or a box-like module housing in which one or more processing units are arranged. The one or more processing units can be arranged in an SMP architecture (FIG. 3) or a NUMA architecture (FIG. 4). In one embodiment, each network domain includes a switch.

The above embodiments of the present invention are illustrative and not limitative. Various alternatives and equivalents are possible. Other additions, subtractions or modifications are obvious in view of the present invention and are intended to fall within the scope of the appended claim.

What is claimed is:

1. A method of optimizing network traffic on a network, said network comprising a plurality of hosts and a plurality of network domains, the method comprising:
    measuring using one or more processing units amounts of network traffic exchanged between each host of the plurality of hosts;
    identifying using the one or more processing units a network domain of the plurality of network domains to which each host of the plurality of hosts is connected to;
    calculating using the one or more processing units a net increase or decrease in inter-domain traffic associated with changing a physical location of each host of the plurality of hosts between the plurality of network domains to generate a list of the physical location changes;
    ranking using the one or more processing units the list of the physical location changes by the net decrease in the inter-domain traffic;
    causing a change in the inter-domain traffic by changing the physical location of a first host of the plurality of hosts in accordance with the ranked list of the physical location changes only if one or more conditions are met,
    wherein at least one of the one or more conditions defines a threshold to be exceeded prior to changing the physical location of the first host of the plurality of hosts, and wherein the plurality of hosts are virtual machines associated with a plurality of servers.

2. The method of claim 1 wherein a highest ranked physical location change of the ranked list is automatically applied as to change the network domain of the plurality of network domains to which the first host of the plurality of hosts is associated with the highest ranked physical location of the ranked list change is connected.

3. The method of claim 1 wherein the at least one of the one or more conditions is defined by availability of a resource associated with a second host of the plurality of hosts connected to the network domain of the plurality of network domains to which the first host of the plurality of hosts is to be changed.

4. The method of claim 3 wherein said resource is a CPU resource.

5. The method of claim 1 wherein the network domain of the plurality of network domains is a switch.

6. A non-transitory computer readable medium comprising instructions that when executed by one or more processors cause the one or more processors to optimize network traffic on a network, the network comprising a plurality of hosts and a plurality of network domains, the instructions further causing the one or more processor to:
measure amounts of network traffic exchanged between each host of the plurality of hosts;
identify a network domain of the plurality of the network domains to which each host of the plurality of hosts is connected to;
calculate a net increase or decrease in inter-domain traffic associated with changing a physical location of each host of the plurality of hosts between the plurality of network domains to generate a list of the physical location changes;
rank the list of the physical location changes by the net decrease in the inter-domain traffic; and
cause a change in the inter-domain traffic by changing a physical location of a first host of the plurality of hosts in accordance with the ranked list only if one or more conditions are met,
wherein at least one of the one or more conditions defines a threshold to be exceeded prior to changing the physical location of the first host of the plurality of hosts, and
wherein the plurality of hosts are virtual machines associated with a plurality of servers.

7. The non-transitory computer readable medium of claim 6 wherein said instructions further cause a highest ranked physical location change of the ranked list to be automatically applied as to change the network domain of the plurality of network domains to which the first host of the plurality of hosts is associated with the highest ranked physical location change of the ranked list is connected.

8. The non-transitory computer readable medium of claim 6 wherein the at least one of the one or more conditions is defined by availability of a resource associated with a second host of the plurality of hosts connected to the network domain of the plurality of network domains to which the first host of the plurality of hosts is to be changed.

9. The non-transitory computer readable medium of claim 8 wherein said resource is a CPU resource.

10. The non-transitory computer readable medium of claim 6 wherein the network domain of the plurality of network domains is a switch.

11. The system operative to optimize network traffic on a network, said network comprising a plurality of hosts and a plurality of network domains, the system comprising:
a processor coupled to a memory;
a module operative to measure amounts of network traffic exchanged between each host of the plurality of hosts;
a module operative to identify a network domain the plurality of the network domains to which each host of the plurality of hosts is connected to;
a module operative to calculate a net increase or decrease in inter-domain traffic associated with changing a physical location of each host of the plurality of hosts between the plurality of network domains to generate a list of the physical location changes;
a module operative to rank the list of physical location changes by the net decrease in the inter-domain traffic;
a module to cause a change in the inter-domain traffic by changing a first host of the plurality of hosts in accordance with the ranked list only if one or more conditions are met,
wherein at least one of the one or more conditions defines a threshold to be exceeded prior to changing the physical location of the first host of the plurality of hosts, and
wherein the plurality of hosts are virtual machines associated with a plurality of servers.

12. The system of claim 11 further comprising a module operative to automatically apply a highest ranked physical location change of the ranked list so as to change the network domain of the plurality of network domains to which the first host of the plurality of hosts is associated with the highest ranked physical location change of the ranked list is connected.

13. The system of claim 11 wherein the at least one of the one or more conditions is defined by availability of a resource associated with a second host of the plurality of hosts connected to the network domain of the plurality of network domains to which the first host of the plurality of hosts is to be changed.

14. The system of claim 13 wherein said resource is a CPU resource.

15. The system of claim 11 wherein the network domain of the plurality of network domains is a switch.

* * * * *